United States Patent [19]
Cohn et al.

[11] Patent Number: 5,426,661
[45] Date of Patent: Jun. 20, 1995

[54] PULSED LASER DISCHARGE STABILIZATION

[75] Inventors: David B. Cohn, Torrance; Hans C. Marciniak, Anaheim, both of Calif.

[73] Assignee: Hughes Aircraft Company, Los Angeles, Calif.

[21] Appl. No.: 307,089

[22] Filed: Sep. 16, 1994

Related U.S. Application Data

[63] Continuation of Ser. No. 151,397, Nov. 9, 1993, abandoned.

[51] Int. Cl.$^6$ .............................................. H01S 3/097
[52] U.S. Cl. ........................................ 372/86; 372/87; 372/88; 372/30; 372/58
[58] Field of Search ........................ 372/29, 30, 86, 87, 372/58, 88, 83, 82

[56] References Cited

U.S. PATENT DOCUMENTS

| | | | |
|---|---|---|---|
| 4,507,788 | 3/1985 | Barnie et al. | 372/83 |
| 4,594,721 | 6/1986 | Penco et al. | 372/88 |
| 4,611,327 | 9/1986 | Clark et al. | 372/86 X |
| 4,613,971 | 9/1986 | Brumme et al. | 372/87 |
| 4,847,853 | 7/1989 | Altman | 372/86 |
| 4,980,894 | 12/1990 | Steinführer | 372/86 |
| 5,048,041 | 9/1991 | Akins et al. | 372/86 X |
| 5,239,553 | 8/1993 | Ono et al. | 372/86 X |

FOREIGN PATENT DOCUMENTS

| | | | |
|---|---|---|---|
| 62-18781 | 1/1987 | Japan | 372/86 |
| 3-89572 | 4/1991 | Japan | 372/30 |

*Primary Examiner*—Rodney B. Bovernick
*Assistant Examiner*—Hemang Sanghavi
*Attorney, Agent, or Firm*—M. E. Lachman; M. W. Sales; W. K. Denson-Low

[57] ABSTRACT

Low power discharge preionizers, or species, are provided by a ionizable species generator that preconditions a laser gas to eliminate arcing in lasers, such as pulsed (high repetition rate) lasers. The present invention creates the species in a low power discharge and the species prevents initial arcs from occurring between high voltage electrodes of the laser. The laser comprises a pressure vessel containing the laser gas, a fan for circulating the laser gas, a heat exchanger, a catalyst, and two high voltage discharge electrodes for exciting the laser gas to create lasing. A high voltage power source is coupled to the electrodes for providing a discharge voltage thereto. A primary auxiliary discharge source is disposed adjacent to the electrodes that is used as a preionizer that creates a low density of charged particles in the main discharge volume to act as a uniform seed for the main voltage pulse derived from the electrodes. The ionizable species generator is disposed in the pressure vessel and provides a low power discharge that preconditions the gas to eliminate arcing in the laser. A preionization discharge generated by the ionizable species generator is used to generate species that have low ionization potential. These easily ionized species are then preionized by ultraviolet radiation generated from the primary auxiliary discharge adjacent to the main discharge electrodes to form a uniformly ionized background for the main discharge to work on. The low ionization potential species replace the gas hydrocarbon contaminants that are adsorbed by the catalyst. A method of eliminating arcing in the laser is also disclosed.

5 Claims, 2 Drawing Sheets

PULSED LASER DISCHARGE STABILIZATION

The present invention was made with Government support under Contract No. DAAA15-90-C-0024 awarded by the Department of the Army. The Government has certain rights in this invention.

This is a continuation application Ser. No. 08/151,397, filed Nov. 9, 1993 now abandoned.

BACKGROUND OF THE INVENTION

1. Field of the Invention

The present invention relates generally to pulsed lasers, and more particularly, to discharge stabilization of high repetition rate lasers.

2. Description of Related Art

The assignee of the present invention has developed TEA $CO_2$ lasers that provide high repetition rate (to 200 Hz) output in a compact, sealed package using a catalyst. However, this compact, sealed, high repetition rate TEA $CO_2$ laser, and other such pulsed lasers that utilize a catalyst, suffer from discharge arcing in the first several shots just after turn-on from a quiescent state. The quiescent state may be as short as tens of seconds. Arc elimination is important for laser lifetime and to guarantee "first shot" capability in a high data rate situation. Heretofore, no means or method of suppressing initial arcing has been available.

High repetition rate TEA $CO_2$ lasers produce laser output by pumping a gas mixture with a high power electrical discharge that takes place between two accurately aligned and surfaced electrodes. Lasers of this type that operate sealed with a catalyst have the problem that when they are first turned on, discharge arcing occurs for the first several shots. These arcs are highly localized current paths that prevent laser emission and cause inordinate wear of the electrodes, with the danger of permanent electrode damage under similar repeated use. However, the initial arcs do generate preionizer species that stabilize subsequent discharges.

The problem of initial shot arcing has been associated with high repetition rate (200 Hz) lasers that are compact, with relatively small gas ballast, and that operate sealed with a heterogeneous catalyst. In these lasers, neutral, low ionization potential hydrocarbons that are necessary for discharge stabilization are attached by the catalyst. The initial arcs produce low ionization potential species from the main gas constituents that replace the hydrocarbons. For very large lasers, operating at reduced repetition rates on the order of 20 Hz, initial shot arcing has generally not been a problem, but it is not yet known if the quality of laser output could be enhanced using the auxiliary discharge concepts of the present invention.

Heretofore, a primary auxiliary discharge located adjacent to the electrodes has been used to preionize low density hydrocarbons that then act as a uniform background for stabilization of the main voltage pulse. This auxiliary discharge is used as a preionizer that creams a low density of charged particles in the main discharge volume to act as a uniform seed for the main voltage pulse. However, this auxiliary discharge has not eliminated the occurrence of the initial arcs, whose overall effect is to deteriorate the laser, impair its performance, and limit its operating lifetime.

Accordingly, it is an objective of the present invention to provide for a method and apparatus that eliminates the above-described discharge arcing problem in pulsed high repetition rate lasers, and the like. It is a further objective of the present invention to provide for a method and apparatus that provides ionizable species having low ionization potential derived from a secondary auxiliary discharge.

SUMMARY OF THE INVENTION

The present invention solves the problem of discharge arcing on initial shots in pulsed high repetition rate lasers by using a secondary auxiliary discharge to produce ionizable species from the laser gas constituents as replacements for those adsorbed by a catalyst. The ionizable species produced by the present invention prevents initial arcs from occurring between the main high voltage electrodes of the laser. This is important because it extends laser lifetime and it provides for "first shot" capability. No other means of suppressing initial arcing in high repetition high repetition rate lasers is known. Therefore, the present invention eliminates a basic operational limitation of existing pulsed high repetition rate lasers, and the like.

More particularly, laser apparatus of the present invention comprises a pressure vessel containing a laser gas, and a fan is disposed in the pressure vessel for circulating the laser gas therein. A heat exchanger is disposed in the pressure vessel, and a catalyst module containing a catalyst is disposed in the pressure vessel. Two high voltage discharge electrodes are disposed in the pressure vessel for exciting the laser gas to create lasing. A high voltage power source is coupled to the electrodes for providing a discharge voltage thereto. The high voltage power source comprises a switch, or thyratron, for example, a trigger input for the switch, and energy storage means comprising a capacitor and an inductor. A primary auxiliary discharge source is disposed adjacent to the main discharge electrodes that is used as a preionizer that creates a low density of charged particles in the main discharge volume by means of ultraviolet radiation to act as a uniform seed for the main voltage pulse from the electrodes. An ionizable species generator in accordance with the present invention that is adapted to provide a secondary auxiliary discharge is disposed through a wall of the pressure vessel, and provides a low power discharge that creates ionizable species for the primary preionizing auxiliary discharge to act upon.

The ionizable species generator comprises a low voltage DC discharge source coupled to a power supply. The low voltage DC discharge source comprises a center electrode, a ceramic insulator disposed around the periphery of the center electrode to prevent high voltage flashover outside the pressure vessel and ensure that the discharge takes place at the tip of the center electrode, and an outer electrode disposed around a portion of the periphery of the ceramic insulator that is grounded to the wall of the pressure vessel.

The primary auxiliary preionization discharge is used to provide a uniform background of ionization just prior to the main discharge. The present invention creates the ionizable species that are a replacement for gas hydrocarbon contaminants adsorbed by the catalyst. These ionizable species produced by the ionizable species generator include excited neutral species, negative ions, and positive ions that have ionization potentials well below those of parent molecules that comprise the laser gas mixture.

In contrast to the attempts of the prior art, in the present invention, the second auxiliary discharge is used to generate species that have low ionization potential. These easily ionized species are then ionized by ultraviolet radiation generated from the primary auxiliary discharge adjacent to the main discharge electrodes in the usual way to form a uniformly ionized background for the main discharge to work on. The low ionization potential species replace the gas hydrocarbon contaminants that are adsorbed by the catalyst.

The present invention also contemplates a method of eliminating arcing in a pulsed laser. The method comprises containing a laser gas in a pressure vessel and circulating the laser gas within the pressure vessel. A low voltage discharge is generated to produce low ionization potential species that are circulated within the pressure vessel. The species are ionized to form a uniform background for laser discharge. Discharging the laser in the presence of the uniformly ionized background eliminates arcing in the pulsed laser.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
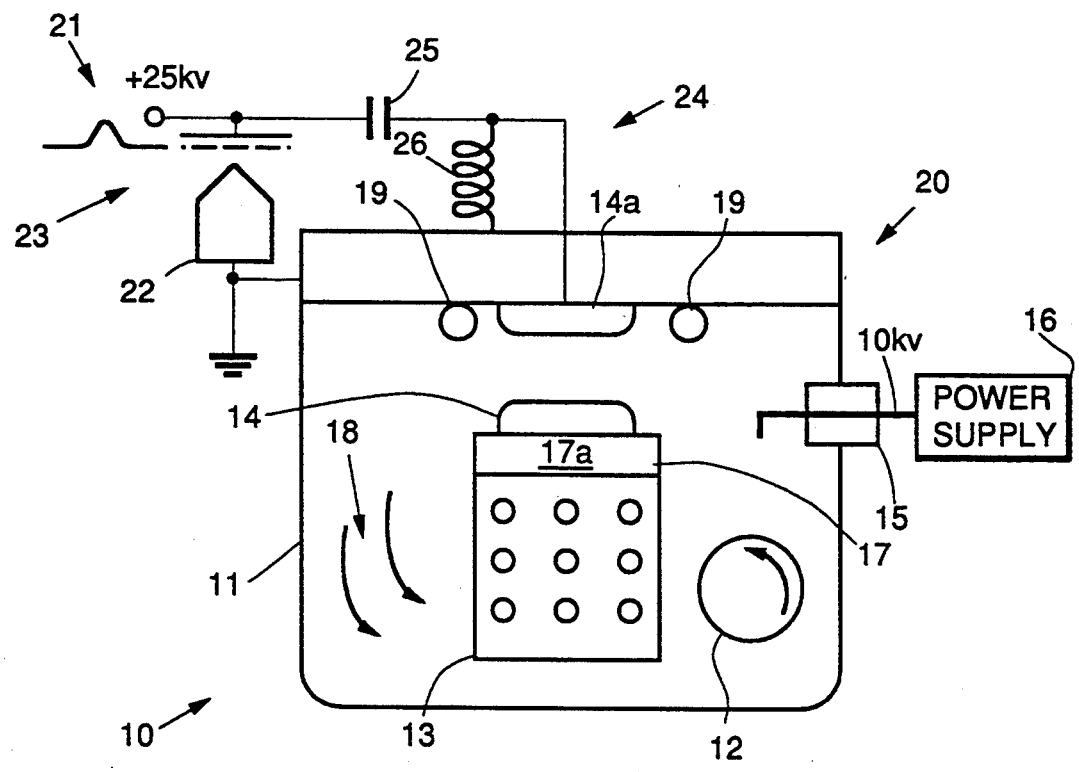
FIG. 1 shows a cross-sectional view of a TEA $CO_2$ laser that incorporates a ionizable species generator in accordance with the principles of the present invention.

Referring to the drawing figures, a cross-sectional view of a pulsed laser 10, such as a TEA $CO_2$ laser 10, for example, that incorporates a ionizable species generator 20 in accordance with the principles of the present invention is shown in FIG. 1. The laser 10 is comprised of a pressure vessel 11 that contains a laser gas 18, and in which is disposed a fan 12, a heat exchanger 13 and two high voltage discharge electrodes 14, 14a. A catalyst module 17 that contains a catalyst 17a is disposed between the heat exchanger 13 and one of the electrodes 14. A high voltage power source 21 is provided that is coupled to the electrodes 14a and to the pressure vessel 11 and which comprises a switch 22, such as a thyratron 22, for example, and a trigger input 23 for the switch 22. The high voltage power source 21 includes an energy storage means 24 comprising a capacitor 25 and an inductor 26. A primary auxiliary discharge source 19 is disposed adjacent to the electrodes 14, 14a that is used as a preionizer that creates a low density of charged particles in the main discharge volume using ultraviolet radiation to act as a uniform seed for the main voltage pulse derived from the electrodes 14, 14a. The ionizable species generator 20 is comprised of a DC discharge source 15 disposed through a wall of the pressure vessel 11 that is coupled to a power supply 16. The DC discharge source 15 is adapted to provide a 10 kV DC discharge inside the pressure vessel 11. The ionizable species generator 20 provides a secondary auxiliary discharge source for the laser 10.

In operation, the fan 12 causes, laser gas 18 to flow across the two high voltage discharge electrodes 14, 14a and to pass through the catalyst module 17 and heat exchanger 13. The high voltage power source 21, charged to 25 kV, supplies pulsed power to the electrodes 14, 14a and this power is pumped into the laser gas 18 through an avalanche discharge of about 200 nsec duration. Uniformity of this discharge is critical in achieving reliable laser output. If the discharge arcs, then all the discharge current is carded in a hot current channel of about 1 mm diameter and the laser gas 18 is not pumped, with the result that laser action is not achieved. Discharge uniformity is therefore an important requisite for laser output.

In order to achieve discharge uniformity, it is essential to have low ionization potential species contained in the laser gas 18 that are preionized by a precursor discharge that takes place about 25 nsec before application of the main discharge voltage pulse by the high voltage power source 21. These low ionization potential species are usually hydrocarbon contaminants. The primary auxiliary discharge source 19 ionizes these species by ultraviolet radiation creating a low density of charged particles in the main discharge volume prior to pulsing of the electrodes 14, 14a. The ionized species act as a uniform seed for the main voltage pulse from the electrodes 14, 14a. However, in the presence of the catalyst 17a, the low ionization potential hydrocarbons are adsorbed.

The role of the ionizable species generator 20, or secondary auxiliary discharge source, is to generate excited species 34 (shown in FIG. 2) that take the place of the low ionization potential hydrocarbons that are depleted by the catalyst 17a. These species 34 produced by the ionizable species generator 20 are carded into the main discharge by the gas flow. The use of the ionizable species generator 20 (DC discharge source 15), therefore guarantees that the first several laser shots of the laser 10 are arc-free. On subsequent shots, the laser discharge itself generates excited species 34 and discharge uniformity is self-perpetuating. If the ionizable species generator 20 is turned off for tens of seconds in the absence of any auxiliary DC discharge preionizer generation, the excited state preionizers are lost through recombination and the main laser discharge arcs for the first few shots when the laser 10 is turned on again.

Under normal operating conditions in a sensor, or other electrooptical device, for example, the laser 10 is turned on and off many times in the course of a normal test session, for example. Therefore, without the generation of preionizers, the main discharge electrodes 14, 14a experience a great number of arcs. These arcs cause erosion and pitting of the electrodes 14, 14a, which may limit the lifetime of the laser 10 and may occasionally cause catastrophic failure if pitting of the electrodes 14, 14a is highly localized. The arcing process is statistical in nature and lifetime degradation or catastrophic failure cannot be predicted. The auxiliary preionization discharge provided by the present invention solves these problems.

Figure 2:
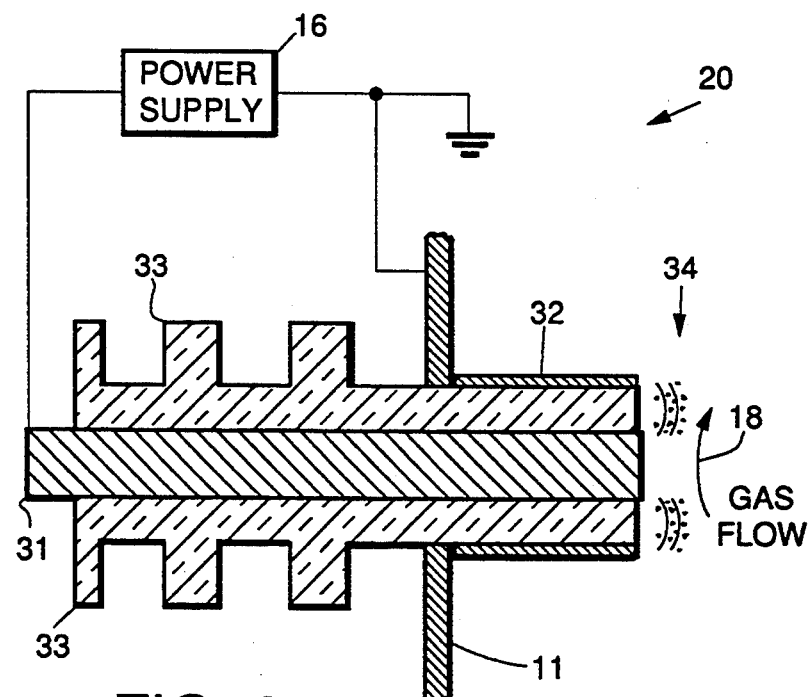
FIG. 2 shows the details of the ionizable species generator of the present invention.

A detailed illustration of the ionizable species generator 20 is shown in FIG. 2. Voltage is applied to a center electrode 31 of the discharge source 15 and an outer electrode 32 is grounded to the wall of the pressure vessel 11. A ceramic insulator 33 prevents high voltage flashover outside the pressure vessel 11 and ensures that the auxiliary discharge takes place at the tip of the center electrode 31. The ionizable species generator 20 is hermetically sealed with welded joints between the ceramic 33 and center electrode 31. In addition, the ceramic 33 is welded into a fitting that makes the connection to the wall of the pressure vessel 11. The electrodes 31, 32 are made of stainless steel and have not shown any wear to date. The power supply 16 operates at low voltage, typically less than 5 kV, and is current limited. The secondary auxiliary discharge caused by the ionizable species generator 20 generates the species 34 as a result of the gas discharge at the tip of the center electrode 31. These species 34 are entrained in the gas flow and carded into the area adjacent the main discharge electrodes 14, 14a where they assist in discharge stabilization.

During operation of the laser 10, the high voltage power supply 16 is turned on and the auxiliary discharge starts immediately. A glow discharge has a negative resistance characteristic; therefore, a power supply current limiter (not shown) is needed to prevent the power supply 16 from entering current saturation. The discharge enters steady state within 1 msec and continues to generate low ionization potential species 34 until the laser 10 is turned off. This is true even if the laser 10 operates in burst mode or intermittently with long periods of nonfiring.

Figure 3:
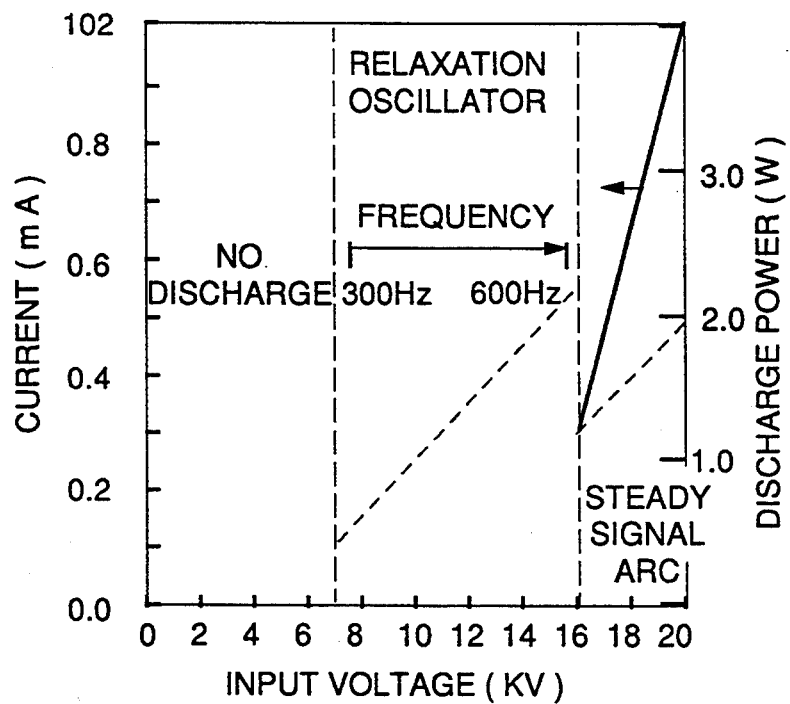
FIG. 3 shows a graph illustrating the discharge characteristics of the present invention.
Figure 4:
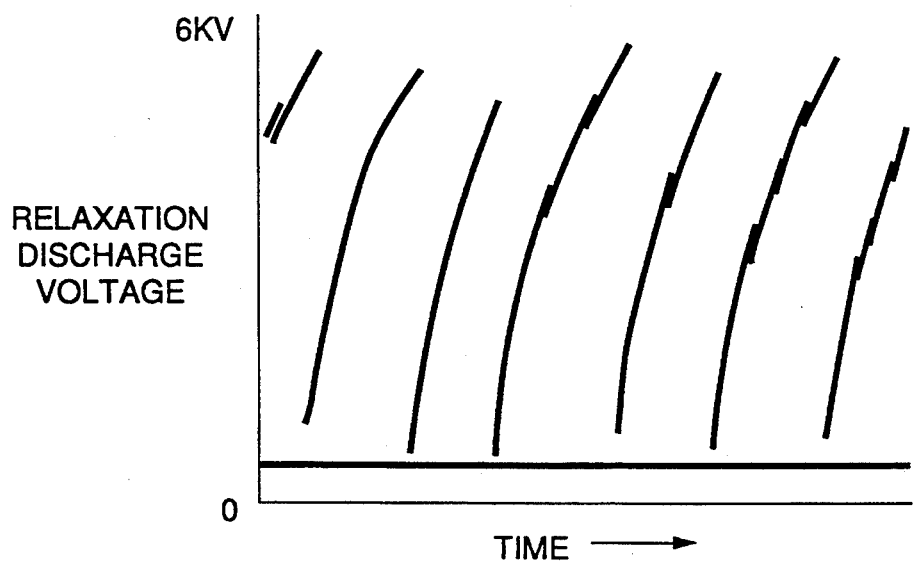
FIG. 4 shows a graph of relaxation discharge voltage versus time for a tested embodiment of the present invention.

Tests have been performed on the laser 10 incorporating the ionizable species generator 20 of the present invention and test results are described below. The primary auxiliary discharge operates in three modes as shown in FIG. 3 in which the discharge current is plotted against the voltage produced by the power source 21. For low supply voltages below about 7 kV, no current flows because the voltage is insufficient to break down the gas. Between 7 kV and 16 kV, however, the gas breakdown voltage is exceeded and the discharge takes the character of a relaxation oscillator. Typical discharge voltage traces as a function of time are shown in FIG. 4. In this case, the power source 21 charges up stray capacitance through a large value resistor (not shown) until the breakdown voltage is reached, at which point the discharge is ignited dumping energy out of the stray capacitance. At breakdown, the voltage quickly falls to effectively zero, because the arc impedance is very low. After this energy dumping, the discharge turns off again for lack of input power and the power source 21 recharges the stray capacitance. This cycle is repeated at frequencies from 300 Hz to 600 Hz, depending upon applied voltage. The higher the charge voltage, the shorter the charge time. The discharge ignites at different locations from shot-to-shot, giving the effect of a series of arcs that fill an annulus between the inner and outer electrodes 14, 14a. Beyond a power source 21 voltage of about 16 kV, the relaxation oscillator frequency is so high that it transitions to a steady state discharge, but at somewhat lower average input power. This is a third phase in which a steady, single arc forms. The single arc has characteristics typical of a glow discharge. That is, it has a negative resistance in which an increase in current leads to a decrease of discharge impedance.

When using the ionizable species generator 20, it is desirable to operate the power source 21 as a relaxation oscillator for the following reasons. In the relaxation oscillator mode, the arc covers a much larger effective area than the steady arc, thereby reducing wear on the electrodes 14, 14a. A relaxation oscillator discharge is characterized by a high voltage phase, followed by relatively high current at low voltage. This has been shown to be desirable for generation of gas dissociation products that benefit from preionization. Finally, the relaxation oscillator operates at lower applied voltage than a steady arc. The optimum operating point is an applied voltage of about 10 kV with discharge input power of about 1.0 Watt.

The various parameters relevant to the results outlined above are as follows:

| | |
|---|---|
| Stray capacitance | 40 pF |
| Input resistor | 50 Mohm |
| Gas/pressure | $CO_2/N_2/He = 1/1/3$ at 1 atm |
| Voltage/polarity | 10 kV/Negative |
| Typical input energy/pulse in relaxation mode | 2 mJ |
| Typical relaxation oscillator frequency | 400 Hz |
| Typical average discharge power | 0.8 W |
| Typical average total power | 1.6 W |

In initial tests, it was found that the ionizable species generator 20 was effective in eliminating first pulse arcing at a laser discharge repetition rate of 1 Hz in which the recirculating fan 12 was not used and the catalyst 17a was at room temperature. Thus, the auxiliary discharge provided by the ionizable species generator 20 has been demonstrated to be effective in eliminating arcing at laser repetition rates of 1 Hz. At higher laser repetition rates, it is necessary to place the primary auxiliary discharge in close proximity to the main laser discharge and to pump it at high average power. Consequently, it is expected that the ionizable species generator 20 will effectively eliminate arcing in the laser 10 with appropriate placement of the discharge electrode 31.

In view of the above, the present invention also provides for a method of eliminating arcing in a pulsed laser 10. The method comprises containing the laser gas 18 in the pressure vessel 11 and circulating the laser gas 18 within the pressure vessel 11. A low voltage discharge is generated to produce species 34 having low ionization potential that are circulated within the pressure vessel 11. The species 34 are preionized to form a uniformly ionized background for laser discharge. Discharging the laser 10 in the presence of the uniformly ionized background of the preionized species 34 substantially eliminates arcing in the pulsed laser 10.

Thus there has been described a new and improved discharge stabilizer for use in pulsed high repetition rate lasers, such as TEA $CO_2$ lasers. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:
1. A laser comprising:
    a pressure vessel containing a laser gas;
    a fan disposed in the pressure vessel for circulating laser gas therein;
    a heat exchanger disposed in the pressure vessel;
    a catalyst disposed in the pressure vessel;
    two high voltage discharge electrodes disposed in the pressure vessel for exciting the laser gas;
    a high voltage power source coupled to the electrodes for providing a discharge voltage to the electrodes;

a primary auxiliary discharge source disposed adjacent to the electrodes that injects low density charged particles into the pressure vessel to act as a uniform seed for a voltage pulse derived from the electrodes wherein said low density charged particles are adsorbed by said catalyst; and a secondary auxiliary discharge source disposed in the pressure vessel that provides a low voltage discharge that generates low ionization potential species that take the place of said low density charged particles that are adsorbed by the catalyst and wherein said low ionization potential species preconditions the laser gas to eliminate arcing in the laser.

2. The laser of claim 1 wherein the secondary auxiliary discharge source comprises a low voltage DC discharge source coupled to a power supply.

3. The laser of claim 2 wherein the low voltage DC discharge source comprises:

a center electrode of the discharge source and a ceramic insulator disposed around the periphery of the center electrode to prevent high voltage flashover outside the pressure vessel and ensure that the discharge takes place at a tip of the center electrode; and an outer electrode disposed around a portion of the periphery of the ceramic insulator that is grounded to the wall of the pressure vessel.

4. The laser of claim 1 wherein the high voltage power source comprises:

a switch;

a trigger input for the switch; and energy storage means coupled to the switch coupled between the power source and a selected one of the electrodes.

5. A method of eliminating arcing in a laser comprising a pressure vessel, a fan, a heat exchanger, a catalyst, a high voltage power source coupled to two high voltage electrodes, a primary auxiliary discharge source disposed adjacent to the electrodes, and a secondary auxiliary discharge source, said method comprising the steps of:

containing a laser gas in said pressure vessel;

circulating the laser gas within the pressure vessel through said fan;

injecting a low density charged particles into the pressure vessel to act as a uniform seed for a voltage pulsed derived from the electrodes wherein the low density charged particles are absorbed by said catalyst;

discharging a low voltage through said secondary auxiliary discharge source that generates low ionization potential species that take the place of said low density charged particles that are adsorbed by the catalyst;

exciting the laser gas through the high voltage electrodes; and discharging the laser in the presence of the low ionized species, which preconditions the laser gas to eliminate arcing in the laser.

* * * * *